(12) United States Patent
Pico et al.

(10) Patent No.: US 10,584,036 B2
(45) Date of Patent: Mar. 10, 2020

(54) METHOD AND DEVICE FOR PRODUCING INORGANIC AEROGEL FIBERS

(71) Applicant: Rheinisch-Westfälische Technische Hochschule (RWTH) Aachen, Aachen (DE)

(72) Inventors: Davide Pico, Aachen (DE); Björn Schulz, Aachen (DE); Alexander Lüking, Aachen (DE); Thomas Gries, Aachen (DE)

(73) Assignee: Rheinisch-Westfälische Technische Hochschulte (RWTH) Aachen, Aachen (DE)

( * ) Notice: Subject to any disclaimer, the term of this patent is extended or adjusted under 35 U.S.C. 154(b) by 35 days.

(21) Appl. No.: 15/547,433

(22) PCT Filed: Jan. 14, 2016

(86) PCT No.: PCT/EP2016/050592
§ 371 (c)(1),
(2) Date: Jul. 28, 2017

(87) PCT Pub. No.: WO2016/120076
PCT Pub. Date: Aug. 4, 2016

(65) Prior Publication Data
US 2018/0044187 A1 Feb. 15, 2018

(30) Foreign Application Priority Data
Jan. 29, 2015 (DE) .......... 10 2015 101 282

(51) Int. Cl.
*D01D 4/02* (2006.01)
*C01B 33/158* (2006.01)
(Continued)

(52) U.S. Cl.
CPC ........ *C01B 33/1585* (2013.01); *C01B 33/158* (2013.01); *C04B 20/0056* (2013.01);
(Continued)

(58) Field of Classification Search
USPC ........................................ 162/145
See application file for complete search history.

(56) References Cited

U.S. PATENT DOCUMENTS 5,089,188 A * 2/1992 Varaprasad ......... C04B 35/6224
264/183
2010/0198177 A1 * 8/2010 Yahiaoui ................. A61F 13/82
604/359

FOREIGN PATENT DOCUMENTS

DE 19533564 A1 3/1997
EP 0 672 635 A1 9/1995
WO WO 2014/135585 A1 9/2014

OTHER PUBLICATIONS

Hoepfner, et al. 2007 "Synthesis and characterization of nanofibrillar cellulose aerogels" *Cellulose* 15(1): 121-129.
(Continued)

*Primary Examiner* — Jacob T Minskey
(74) *Attorney, Agent, or Firm* — Knobbe, Martens, Olson & Bear, LLP

(57) ABSTRACT

A method for producing an inorganic silica gel fiber or aerogel fiber, comprising the following steps: a) extrusion of a gel, in particular a hydrogel or alcogel, by means of a spinneret directly into a coagulation bath to form at least one filament, b) stretching of the filament in the coagulation bath, c) regeneration of the filament by extraction from the coagulation bath, and d) supercritical drying or freeze drying in order to convert the filament into a silica fiber, in particular an aerogel fiber.

10 Claims, 1 Drawing Sheet

(51) Int. Cl.
  *D01D 5/06*    (2006.01)
  *C04B 20/00*   (2006.01)
  *D01D 5/12*    (2006.01)
  *D01D 10/06*   (2006.01)
  *D21H 13/36*   (2006.01)
  *D21H 13/40*   (2006.01)
  *D21H 15/10*   (2006.01)
  *C04B 111/28*  (2006.01)

(52) U.S. Cl.
  CPC .................. *D01D 4/02* (2013.01); *D01D 5/06* (2013.01); *D01D 5/12* (2013.01); *D01D 10/06* (2013.01); *D21H 13/36* (2013.01); *D21H 13/40* (2013.01); *D21H 15/10* (2013.01); *C04B 2111/28* (2013.01)

(56) References Cited

OTHER PUBLICATIONS

International Search Report in PCT/EP2016/050592, dated Apr. 28, 2016.
Lemstra et al. 1985 "Chain-extended flexible polymers" *Die Angewandte Makromolekulare Chemie* 145/146: 343-358.
Rofix 2014 "AeroCalce IB 980" Retrieved from the Internet at roefix.at/var/fixitgruppe/storage/ilcatalogue/files/pdf/ATDE/Technisches_Merblatt_AeroCalce_IB_980_Aerogels-Vliesmatte_DC0011700.pdf.
Sun, et al. 2008 "Magnetite-embedded cellulose fibers prepared from ionic liquid" *Journal of Materials Chemistry* 18(3): 283-290.

\* cited by examiner

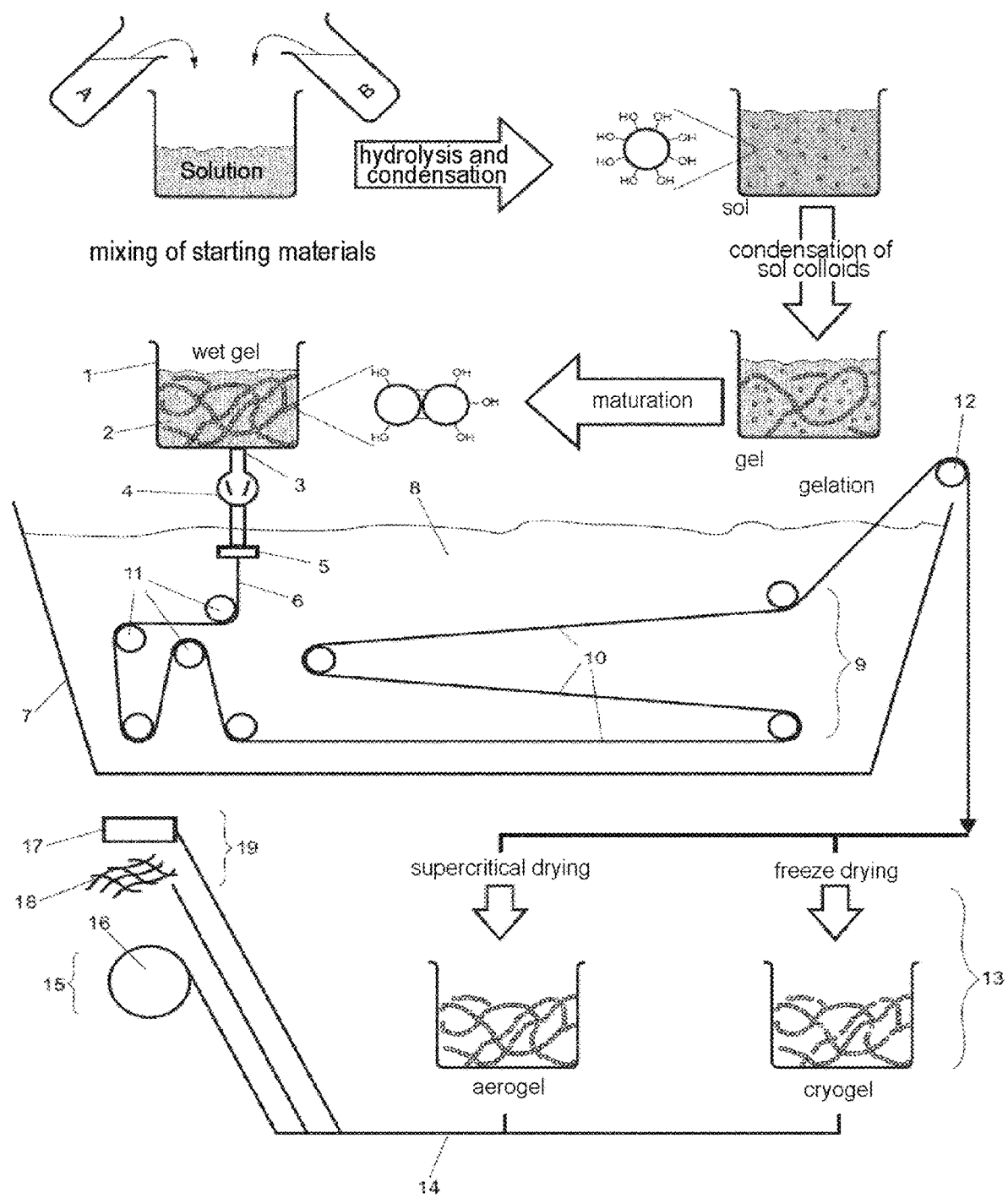

METHOD AND DEVICE FOR PRODUCING INORGANIC AEROGEL FIBERS

FIELD

The present invention concerns a method and apparatus for producing inorganic type aerogel fibers and also a shaped article or fiber web comprising such aerogel fibers. The particular concern is with oxidic or nonoxidic, thermally stable materials used, for example, as thermal insulation, acoustic insulation, high-temperature gaskets and similar applications. Inorganic aerogels, for example silica aerogel, are highly porous rigid solids that are up to 99.98% by volume pores. It is these which are responsible for the outstanding thermally insulating properties with a thermal conductivity of, for example, 0.013 to 0.020 W/(m·K) as compared with values of 0.030 to 0.050 W/(m·K) for expanded polystyrene (EPS), mineral wool or foam glass.

However, silica aerogels are rigid solids that are very brittle in that they tend to break on being subjected to vibrations, shocks or accelerations, explaining why their possible applications have been very limited to date. The aerogel fibers with which the present invention is concerned are inorganic type aerogel fibers, for example silica aerogel fibers.

BACKGROUND

The cellulose type aerogel fibers hitherto described in DE 102006049179 A1, for example, are purely organic-based.

EP 1 144 323 B1, for example, discloses producing silica fibers by spinning, but aerogel fibers are not obtainable in the manner described.

U.S. Pat. No. 5,089,188 describes a wet-spinning process for silica fibers, but said process can also not lead to aerogel fibers.

U.S. Pat. No. 6,764,667 discloses essential starting materials and method steps for producing a shaped aerogel article, but again no way to produce aerogel fibers is derivable therefrom.

U.S. Pat. No. 8,647,557 finally discloses a method which gives rise to a silica aerogel incorporated in a fiber web. Again there is no production of fibers consisting of aerogel.

SUMMARY

The problem addressed by the present invention is that of extending the range of possible uses for aerogel, especially by at least reducing or even resolving/avoiding the brittleness issue of this material. An adapted/alternative method of producing an inorganic type silica or aerogel fiber is to be devised for this in order that in each case the material properties of aerogels are precisely controllable. Suitable devices for producing these fibers and also (co)aligned shaped articles comprising aerogel fibers are additionally to be devised. In contradistinction to previously known aspects of organic aerogels, the present invention seeks to devise method steps which are specifically used for production of inorganic type aerogel fibers and combine into an overall process.

The problem is solved by the methods and devices disclosed herein. The stated problem is additionally solved by corresponding shaped articles and/or the fiber webs. Advantageous embodiments, useful alone and in particular technically sensible combinations with each or one another, are described. The description including particularly also the FIGURE description elucidates the invention and discloses further combinations of features that are capable of further particularizing the invention.

The method proposed herein for producing inorganic type aerogel fibers comprises the steps of:
- extruding a hydrogel through a spinnerette die as at least one filament directly into a coagulation bath,
- stretching the filament in the coagulation bath,
- regenerating the filament by extraction from the coagulation bath,
- supercritical drying or freeze drying to transform the filament into a silica fiber, especially an aerogel fiber.

The individually adduced steps of the method above proceed in essence consecutively, in the above-stated order, in the production process of the fiber. What is important with the step of stretching and concertedly winding up the filament is that this is done such that the filament is at all times protected by solvent from any drying out.

The step of regenerating the filaments obtained departs from previously known methods for production of fibers. In order that filaments having suitably large surface areas may be obtained, the swollen network of gel has to be in a form that allows a drying step, such as supercritical or freeze drying. This may be accomplished by
- gradual change of solvent at increasing gradient of concentration,
- regeneration of an extractive solvent via adsorption via solid phases or suitable ion exchanges,
- conventional liquid-solid extraction (e.g., according to Soxhlet or Hagen-Thielepape).

BRIEF DESCRIPTION OF THE DRAWING

The invention and also the technical environment will now be more particularly described with reference to the FIGURE. It must be noted that the FIGURE shows a single exemplary embodiment whereto the invention, however, is not restricted. Specifically:

FIG. 1: shows a processing sequence to produce an aerogel fiber in a partly simplified and schematic depiction.

DETAILED DESCRIPTION

It was initially determined that very fine types of aerogel fibers are very flexible in contrast to shaped articles having comparatively thick walls, so they are usable for example to spin webs and/or fill shaped articles that are significantly less sensitive to vibrations, shocks and other mechanical stressors. Intensive studies were carried out on that basis to find out how such a fiber might perform on textile processing into webs or wovens. This was the starting point for the technical aspects hereinbelow.

The fibers obtained are in principle spinnable into all known fibrous forms of textile technology, for example monofilaments, multifilaments, hollow fibers, but also sheetings. Individual filament diameters ranging from nanofibrillary structures of about 100 nm (nanometers) through to 1.000 μm (micrometers) for coarse hollow fibers are possible here in principle. An important difference from conventional technologies of spinning is that stretching is effected during spinning drawdown and the filaments obtained are wound up directly in the coagulation bath in order that they may not run dry. This, in contradistinction to conventional methods, would lead to a collapse of the nanoprestructurization in the gel. The filaments obtained after supercritical drying have comparable specific surface areas to aerogel monoliths in the range from 200 to 1500 m²/g (square meters/grams). However, smaller specific surface areas of 50 to 200 m²/g are also obtainable by inclusion of subsequent sintering steps.

To facilitate an understanding of the invention, it should be noted that the preparation of hydrogel by one of the familiar sol-gel processes involves a gelation to form long-chain molecules which are initially present in the gel in a relatively orderless state. On extrusion through a spinnerette die as at least one filament into a coagulation bath, these chains become partly aligned and combine to form yet more complex structures. It has now been determined that it is precisely in this state, and while still in the coagulation bath, that the filament should be subjected to a stretching step whereby the long-chain molecules very substantially (all) align in the direction of the filament. As a result, the filament lengthens and its tensile strength increases. It is only once the stretching step is complete that the filament is regenerated by extraction from the coagulation bath and subsequently sent to a supercritical drying process or to a freeze drying process wherein the filament is transformed into a silica fiber, especially an aerogel fiber. Whereas any direct contact with air at a point after the extruding step and/or before the stretching step would lead to a disintegration of the gel structure due to capillary forces, the procedure proposed here, namely to extrude and stretch in a coagulation bath, is able to maintain the gel structure through to the last step to then produce an aerogel filament of greater flexibility.

Preferably, the filament is moving through the coagulation bath throughout the entire stretching process, even for instance when the stretching process comprises two or more stages. Direction changers and connecting sectors should all be (permanently) below the liquid level of the coagulation bath in order that any contact of the filament with ambient air be avoided.

The starting material used for extrusion is preferably a suitable gel, or gel fiber, which is later transformable into an aerogel. A hydrogel and/or an alcogel are concerned here in particular. Suitable materials for this include various ones known and already used for production of aerogel, for example sol-gel precursors, such as tetraethyl orthosilicate (TEOS), tetramethyl orthosilicate (TMOS), alternative alkoxides or other suitable hydrolyzable inorganic or organometallic gel precursors, provided the viscosity for an extrusion through a spinnerette die can be suitably established (viscosity values suitable for this purpose are on 20 Pas (pascal-seconds), for example). Filaments having an initial diameter of 0.01 to 1000 μm (micrometers) are extrudable in this way. It will be appreciated that it is also possible for numerous filaments to be concurrently extruded and stretched or concurrently extruded, combined in the coagulation bath and then concurrently stretched therein.

The final fiber (silica fiber or aerogel fiber) obtained by the method described is preferably then wound up as a package or directly processed into a fiber web or a shaped article. When the final fiber is wound up as a package, this package may later be sent for further textile processing and/or become part of a production process, of a web or shaped article.

In line with another aspect, there is also proposed an apparatus for producing inorganic type silica or aerogel fibers, which comprises at least the following components:
a stock supply vessel for gel,
a spinnerette die for extruding at least one filament from the gel, especially a hydrogel or alcogel,
a tub for a coagulation bath, especially a suitable for example thermostatable tub,
at least one stretching device for the filament in the tub,
an extraction device,
a drying device outside the tub.

This apparatus is especially suitable and adapted for performing the method likewise proposed.

A feature to be emphasized is that the spinnerette die is disposed in relation to the tub in particular so as to make possible an extrusion directly into a coagulation bath (the immersion method). The extrudate should then also continue to travel consistently below a coagulation bath in the tub. It is only the extraction device which leads the extrudate out of the tub into the ambient air and to the subsequent drying device. It is this procedure that prevents premature collapse of voids and what makes the production of an aerogel in the drying step possible in the first place.

Preferably, a plurality of stretching stages and direction changers are disposed in the tub, in order to allow very complete stretching coupled with gentle handling of the filament.

The roll axes, bearings and drives are usually disposed above the liquid level in known apparatus for wet spinning. This is modified, as far as necessary, in the present invention by stretching units and direction changers being changed such that they make possible a process completely without running dry, as is technologically attainable, for example, via suitable locks, liquidtight mountings of drive axles and/or liquidtight drives and bearings.

The drying device required is preferably adapted for a supercritical drying process or a freeze drying process. The filament is thereby desolventizable in a gentle manner to create an aerogel fiber having the desired high porosity.

The inorganic gels obtained are transformed into aerogels by being subjected to a suitable drying process, for example freeze drying or supercritical drying or alternative versions. There is hot supercritical drying and there is cold supercritical drying, depending on the drying medium used in the supercritical drying process used as standard. Supercritical drying is required because the absence of capillary forces during the drying process means that the nanostructures do not experience any stresses which might damage them. Selected solvents for this drying step are reported in the table which follows. It shows data for supercritical solvents as compiled from various pertinent references (Aegerter, Michel Andre, Leventis, Nicholas, Koebel, Matthias M. (Eds.), Aerogels Handbook, Springer Verlag 2011):

| Solvent | Critical temperature (° C.) | Critical pressure (bar) |
| --- | --- | --- |
| $H_2O$ | 374 | 220.88 |
| isobutanol | 290 | 43.57 |
| benzene | 289 | 49.24 |
| isopropanol | 265 | 51.57 |
| ethanol | 240 | 63.83 |
| methanol | 240 | 80.04 |
| acetone | 235 | 43.57 |
| freon-F | 214 | 30.0 |
| diethyl ether | 192 | 36.5 |
| $SO_2$ | 157 | 79.0 |
| propane | ≈97 | 42.6 |
| nitrous oxide | 36 | 73.0 |
| carbon dioxide | 31 | 74.0 |
| freon 13 | 29 | 13.7 |
| freon 23 | 26 | 48.6 |
| freon 116 | 20 | 30.0 |

The result of this drying step is that the prestructured network swollen with a solvent (which is suitable for a supercritical process, see above table) can ultimately be replaced by air so as to retain a high porosity in the product obtained.

Thereafter, the fiber formed is preferably sent to a winding device, which creates a package out of the fiber, or there ensues a form of further processing into some other desired form, especially a web or a shaped article. Winding to a package is a sensible option provided the filaments do not dry out in the process. Conceivable alternatives to the winding step include steps—such as, for example, the step of wet laying to form papers or webs—to be able to thereby obtain gel fibers in the form of webs, felts, papers. These similarly are subsequently dried in a suitable manner to form aerogel fibers.

There is further also proposed a novel type of shaped article wherein the shaped article comprises up to 100 wt % (weight percent) of aerogel fibers, although it is also possible for a certain proportion of up to not more than 50 wt %, preferably up to not more than 20 wt %, more preferably up to no more than 10 wt %, to consist of ceramic fibers and/or glass fibers and/or binder. The use of additional constituents is especially of decisive advantage for products whenever additional properties are achieved through incorporation of further varieties of fiber, as for structural, thermally high-stability or extremely heat-resistant membrane systems (as, for example, for high-temperature fuel cells, thermally high-stability isolators/insulators, filters, etc.), insulating/isolating component parts for hot catalysts, carbon particle filters, industrial exit gas cleaning systems or the like.

It is preferable in this connection for the aerogel fibers to have been particularly produced according to the method described and/or using the apparatus described.

According to application scenario, the aerogel fibers are simple to press into a predetermined shape without a binder being required to maintain this shape. This will be the case in particular when packing out cavity spaces with the fiber material for the purpose of thermal insulation or the like. There are other applications where an admixture of binder or a type of sintering process or also the blending with other fibers may be of advantage if specific product properties are to be realized to meet issues posed by the application.

There is additionally also proposed a novel form of fiber web comprising 10 wt % to 100 wt % (weight percent) of aerogel fibers, while any balance consists of other fibers, as for example of ceramic fibers and/or glass fibers and/or binder. A "web" is herein to be understood as meaning an ordered and/or chaotic arrangement of fibers and/or fiber portions. Specific examples include wovens, random-laid, etc.

It is preferable in this connection for the aerogel fibers to have been particularly produced according to the method described and/or using the apparatus described.

FIG. 1, in the manner of a schematic process flow diagram, shows the production of a gel 2, especially a hydrogel (or alcogel), suitable for further processing into an aerogel. This gel 2 is provided in a stock supply vessel 1 after it was produced in a conventional manner from components A and B in solution and transformed, by hydrolysis and condensation into a sol and further by a condensation of sol colloids, into a gel. After a maturation process it turns into a wet gel, which is extruded through an outlet 3, via a pump 4 and a spinnerette die 5 directly into a coagulation bath 8 to form therein at least one filament 6. The coagulation bath 8 is situated in a tub 7 sufficiently large and sufficiently highly filled with the coagulation bath 8 that not just the spinnerette die, but all subsequent direction changers 11 and stretching devices 9 can be accommodated below the bath level. Preferably, the filament 6 is very completely stretched in a plurality of stretching stages 10. It is only thereafter that an extraction apparatus 12 serves to pull the filament out of the coagulation bath, regenerate it and send it to a drying device 13. This drying device may be for supercritical drying or for freeze drying. This drying converts the extruded and stretched filament 6 into an aerogel fiber 14 which can be wound up in a winding device 15 as a package 16 or sent to a further processing stage 19 where it is processed into a shaped article 17 or a fiber web 18.

The present invention combines the good insulating properties of aerogels with the flexibility of fiber materials and thus opens vistas to further possible applications for aerogels.

LIST OF REFERENCE SIGNS

1 stock supply vessel
2 gel, especially hydrogel or alcogel
3 outlet
4 pump
5 spinnerette die
6 filament
7 tub
8 coagulation bath
9 stretching device
10 stretching stage
11 direction changer
12 extraction apparatus
13 drying device
14 aerogel fiber
15 winding device
16 package
17 shaped article
18 fiber web
19 further processing stage

The invention claimed is:

1. A method of producing an inorganic aerogel fiber, comprising:
   extruding a gel through a spinnerette die as at least one filament directly into a coagulation bath, wherein the at least one filament has a diameter of 0.01 um to 1,000 um,
   stretching the at least one filament in the coagulation bath,
   extracting the at least one filament from the coagulation bath,
   regenerating the at least one filament by extraction, and supercritical drying or freeze drying to transform the at least one filament into a flexible aerogel fiber.

2. The method as claimed in claim 1, further comprising moving the at least one filament through the coagulation bath throughout the entire stretching step.

3. The method as claimed in claim 1, wherein the gel comprises a hydrogel or an alcogel, which is later transformable into an aerogel.

4. The method as claimed in claim 1, wherein the aerogel fiber is wound up as a package or processed into a fiber web or a shaped article.

5. The method as claimed in claim 1, further comprising processing the aerogel fiber into a shaped article, wherein the shaped article comprises 50 wt % to 100 wt % of aerogel fibers and any balance comprises other fibers, including at least one of ceramic fibers, glass fibers, or binder.

6. The method as claimed in claim 1, further comprising processing the aerogel fiber into a fiber web, wherein the fiber web comprises 10 wt % to 100 wt % of aerogel fibers and any balance comprises other fibers, including at least one of ceramic fibers, glass fibers, or binder.

7. The method as claimed in claim 1, further comprising winding up the at least one filament directly in the coagulation bath.

8. The method as claimed in claim 1, wherein regenerating the at least one filament comprises gradually changing a solvent at increasing gradient of concentration.

9. The method as claimed in claim 1, wherein regenerating the at least one filament comprises regenerating an extractive solvent via adsorption via solid phases or suitable ion exchanges.

10. The method as claimed in claim 1, wherein regenerating the at least one filament comprises liquid-solid extraction.

\* \* \* \* \*

UNITED STATES PATENT AND TRADEMARK OFFICE
CERTIFICATE OF CORRECTION

PATENT NO.       : 10,584,036 B2
APPLICATION NO.  : 15/547433
DATED            : March 10, 2020
INVENTOR(S)      : Davide Pico Page 1 of 1

It is certified that error appears in the above-identified patent and that said Letters Patent is hereby corrected as shown below:

On the Title Page

Item (73), Line 2, under Assignee, change "Hochschulte" to --Hochschule--.

Signed and Sealed this
Twenty-ninth Day of September, 2020

Andrei Iancu
*Director of the United States Patent and Trademark Office*